United States Patent
Govind et al.

(10) Patent No.: US 10,036,337 B2
(45) Date of Patent: Jul. 31, 2018

(54) SYSTEMS AND METHOD FOR EXHAUST GAS RECIRCULATION

(71) Applicant: General Electric Company, Schenectady, NY (US)

(72) Inventors: Shrinivas Govind, Bangalore (IN); Jayesh Jain, Bangalore (IN); Pushkar Haresh Sheth, Bangalore (IN)

(73) Assignee: General Electric Company, Schenectady, NY (US)

( * ) Notice: Subject to any disclaimer, the term of this patent is extended or adjusted under 35 U.S.C. 154(b) by 92 days.

(21) Appl. No.: 15/082,106

(22) Filed: Mar. 28, 2016

(65) Prior Publication Data

US 2017/0276079 A1    Sep. 28, 2017

(51) Int. Cl.
| | |
|---|---|
| F02B 33/44 | (2006.01) |
| F02B 29/04 | (2006.01) |
| F02B 33/00 | (2006.01) |
| F02D 41/00 | (2006.01) |
| F02M 26/24 | (2016.01) |
| F02M 35/10 | (2006.01) |
| F02M 26/32 | (2016.01) |
| F02M 26/08 | (2016.01) |
| F02D 41/14 | (2006.01) |

(52) U.S. Cl.
CPC ..... *F02D 41/0052* (2013.01); *F02D 41/0065* (2013.01); *F02M 26/08* (2016.02); *F02M 26/24* (2016.02); *F02M 26/32* (2016.02); *F02M 35/10222* (2013.01); *F02D 41/144* (2013.01); *F02D 2041/0067* (2013.01); *F02D 2200/021* (2013.01)

(58) Field of Classification Search
CPC ............. F02D 41/0077; F02D 41/0052; F02D 41/0082; F02M 26/28; F02M 26/32; F02M 35/10222
USPC ......... 60/605.2, 599, 612; 701/108; 123/562
See application file for complete search history.

(56) References Cited

U.S. PATENT DOCUMENTS

| | | | | |
|---|---|---|---|---|
| 7,451,749 | B2 * | 11/2008 | Kardos ................. | F02M 26/27 123/568.12 |
| 7,941,999 | B2 * | 5/2011 | Kasper ................. | F02M 26/05 60/605.2 |
| 7,958,873 | B2 * | 6/2011 | Ernst .................... | F02M 26/05 60/605.2 |

(Continued)

FOREIGN PATENT DOCUMENTS

| | | | | | |
|---|---|---|---|---|---|
| DE | 102007052117 A1 | * | 5/2009 | ......... | F02B 29/0425 |
| JP | 2005127137 A | * | 5/2005 | | |
| WO | WO 2015090343 A1 | * | 6/2015 | ......... | F02D 41/0007 |

OTHER PUBLICATIONS

An English Translation of Kawahara (Pub. Number JP 2005-127137 A), published on May 19, 2005.*

*Primary Examiner* — Thai Ba Trieu
(74) *Attorney, Agent, or Firm* — GE Global Patent Operation; John A. Kramer (57) ABSTRACT

Various systems and methods are provided for exhaust gas recirculation. In one example, an exhaust gas recirculation (EGR) system includes an EGR passage coupling an engine exhaust system to an engine intake system, a first EGR cooler positioned in the EGR passage, the first EGR cooler configured to cool EGR with a first fluid, and a second EGR cooler positioned in the EGR passage downstream of the first EGR cooler, the second EGR cooler configured to cool EGR with a second fluid.

12 Claims, 4 Drawing Sheets

(56) References Cited

U.S. PATENT DOCUMENTS

| | | | | |
|---|---|---|---|---|
| 8,028,522 B2* | 10/2011 | Irmler | .................... | F02M 26/31 |
| | | | | 60/599 |
| 8,555,638 B2* | 10/2013 | Luft | ...................... | F02M 26/43 |
| | | | | 60/605.2 |
| 8,789,370 B2* | 7/2014 | Stegmaier | ............. | F02B 37/013 |
| | | | | 60/612 |
| 2007/0089717 A1* | 4/2007 | Saele | ...................... | F02M 26/15 |
| | | | | 60/605.2 |
| 2007/0193270 A1* | 8/2007 | Roozenboom | ........ | F02B 37/013 |
| | | | | 60/612 |
| 2010/0180584 A1* | 7/2010 | Berger | .................. | F02M 26/28 |
| | | | | 60/320 |
| 2014/0026565 A1* | 1/2014 | Peters | .................. | F02D 41/0007 |
| | | | | 60/612 |
| 2014/0067236 A1* | 3/2014 | Henry | ................ | F02D 41/0007 |
| | | | | 701/108 |
| 2014/0109571 A1* | 4/2014 | Primus | ............... | F02D 41/0007 |
| | | | | 701/108 |
| 2014/0209073 A1 | 7/2014 | Johnson | | |
| 2014/0331978 A1 | 11/2014 | Goetzke et al. | | |
| 2016/0333773 A1* | 11/2016 | Bauer | ................ | F02D 41/0007 |
| | | | | 60/612 |

* cited by examiner

SYSTEMS AND METHOD FOR EXHAUST GAS RECIRCULATION

BACKGROUND

Technical Field

Embodiments of the subject matter disclosed herein relate to engine systems.

Discussion of Art

In order to meet emissions standards mandated by various emissions regulating agencies, internal combustion engines may be configured with various aftertreatment devices, such as selective catalytic reduction systems, and/or with exhaust gas recirculation (EGR) to lower emission production and remove emissions from the exhaust. For example, EGR may reduce peak combustion temperatures, thus lowering NOx emissions. EGR systems may include an EGR cooler configured to cool the EGR prior to mixing with intake air in order to further reduce combustion temperatures. The EGR cooler may be a liquid-to-air heat exchanger that cools the EGR via coolant from an engine coolant system, for example. While such a configuration adequately cools the EGR, the thermal gradient across the EGR cooler may be relatively large due to the high exhaust gas temperature and the lower-temperature coolant at the inlet of the EGR cooler. This temperature gradient may lead to EGR cooler performance issues or EGR cooler degradation.

BRIEF DESCRIPTION

In one embodiment, an exhaust gas recirculation (EGR) system includes an EGR passage coupling an engine exhaust system to an engine intake system, a first EGR cooler positioned in the EGR passage, and a second EGR cooler positioned in the EGR passage downstream of the first EGR cooler. The first EGR cooler is configured to cool EGR with a first fluid, and the second EGR cooler is configured to cool EGR with a second fluid.

DETAILED DESCRIPTION

The following description relates to embodiments of systems for reducing the thermal load of an exhaust gas recirculation (EGR) cooler. In one embodiment, the EGR upstream of the EGR cooler may be "pre-cooled" via a secondary cooler that receives a relatively high temperature cooling fluid (e.g., higher temperature than a temperature of the cooling fluid of the primary EGR cooler), such as exhaust gas from downstream of a turbine. By pre-cooling the EGR via the secondary cooler, the EGR entering the primary EGR cooler may be at a lower temperature, lowering the thermal gradient at the primary EGR cooler.

In another embodiment, lower-temperature exhaust may be used as EGR. For example, exhaust gas from downstream of a turbine may replace or be mixed with exhaust from upstream of the turbine to form the EGR entering the EGR cooler. In doing so, the temperature of the EGR may be lowered to a range that does not create a high thermal gradient at the EGR cooler.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a locomotive is provided as an example of a mobile platform supporting a system incorporating an embodiment of the invention.

Figure 1:
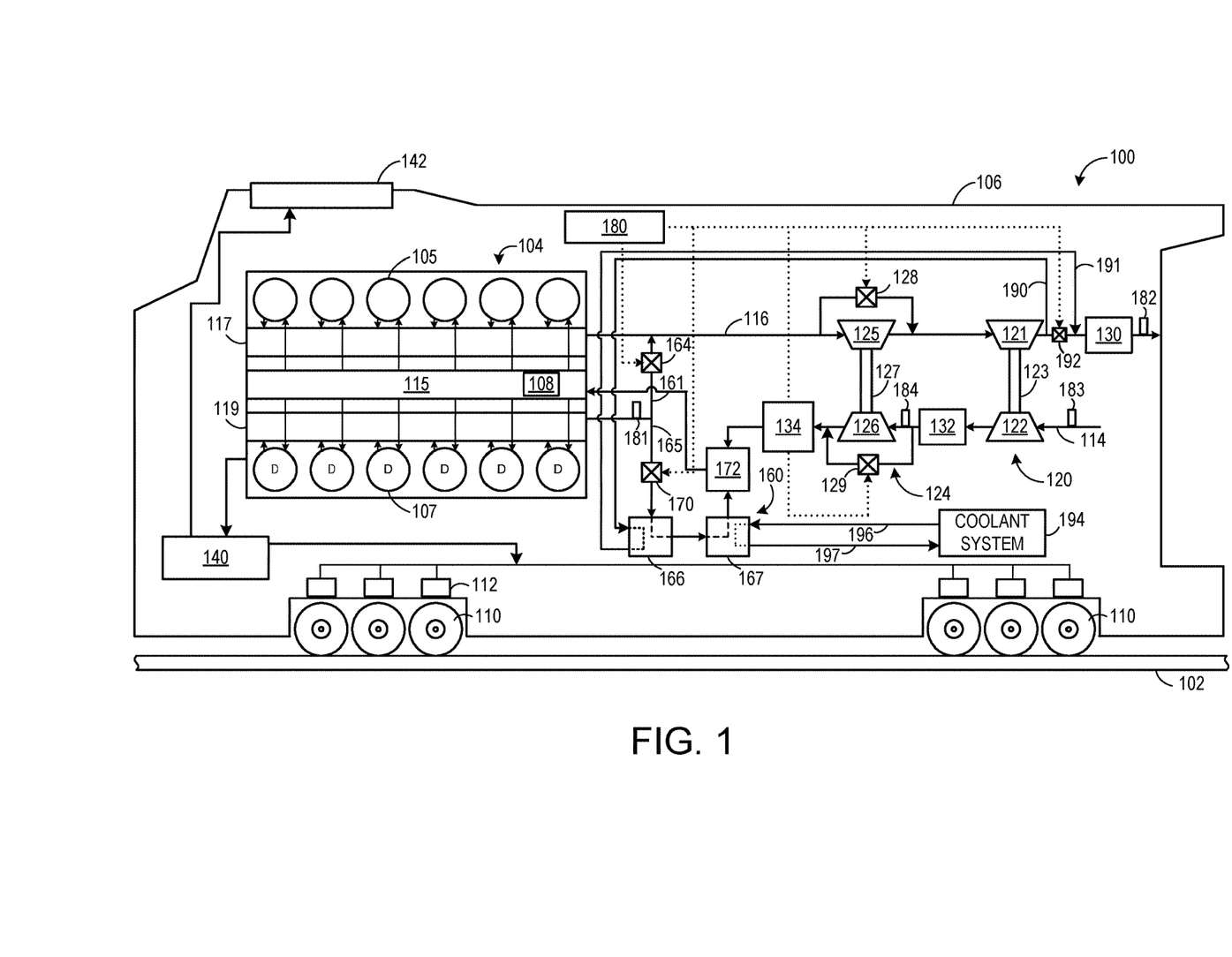
FIG. 1 shows a vehicle system with an EGR system according to a first embodiment.

Before further discussion of the approach for reducing EGR cooler thermal load, an example of a platform is disclosed in which an engine may be configured for a vehicle, such as a rail vehicle. For example, FIG. 1 shows a block diagram of an embodiment of a vehicle system 100 (e.g., a locomotive system), herein depicted as a rail vehicle 106, configured to run on a rail 102 via a plurality of wheels 110. As depicted, the rail vehicle 106 includes an engine 104. In other non-limiting embodiments, the engine 104 may be a stationary engine, such as in a power-plant application, or an engine in a marine vessel or off-highway vehicle propulsion system as noted above.

The engine 104 receives intake air for combustion from an intake, such as an intake manifold 115. The intake may be any suitable conduit or conduits through which gases flow to enter the engine. For example, the intake may include the intake manifold 115, the intake passage 114, and the like. The intake passage 114 receives ambient air from an air filter (not shown) that filters air from outside of a vehicle in which the engine 104 may be positioned. Exhaust gas resulting from combustion in the engine 104 is supplied to an exhaust, such as exhaust passage 116. The exhaust may be any suitable conduit through which gases flow from the engine. For example, the exhaust may include an exhaust manifold 117, the exhaust passage 116, and the like. Exhaust gas flows through the exhaust passage 116, and out of an exhaust stack of the rail vehicle 106. In one example, the engine 104 is a diesel engine that combusts air and diesel fuel through compression ignition. In other non-limiting embodiments, the engine 104 may combust fuel including gasoline, kerosene, biodiesel, or other petroleum distillates of similar density through compression ignition (and/or spark ignition).

In one embodiment, the rail vehicle 106 is a diesel-electric vehicle. As depicted in FIG. 1, the engine 104 is coupled to an electric power generation system, which includes an alternator/generator 140 and electric traction motors 112. For example, the engine 104 is a diesel engine that generates a torque output that is transmitted to the alternator/generator 140 which is mechanically coupled to the engine 104. The alternator/generator 140 produces electrical power that may be stored and applied for subsequent propagation to a variety of downstream electrical components. As an example, the alternator/generator 140 may be electrically coupled to a plurality of traction motors 112 and the alternator/generator 140 may provide electrical power to the plurality of traction motors 112. As depicted, the plurality of traction motors 112 are each connected to one of a plurality of wheels 110 to provide tractive power to propel the rail vehicle 106. One example configuration includes one traction motor per wheel. As depicted herein, six pairs of traction motors correspond to each of six pairs of wheels of the rail vehicle. In another example, alternator/generator 140 may be coupled to one or more resistive grids 142. The resistive grids 142 may be configured to dissipate excess engine torque via heat produced by the grids from electricity generated by alternator/generator 140.

In the embodiment depicted in FIG. 1, the engine 104 is a V-12 engine having twelve cylinders. In other examples, the engine may be a V-6, V-8, V-10, V-16, I-4, I-6, I-8, opposed 4, or another engine type. As depicted, the engine 104 includes a subset of non-donor cylinders 105, which includes six cylinders that supply exhaust gas exclusively to a non-donor cylinder exhaust manifold 117, and a subset of donor cylinders 107, which includes six cylinders that supply exhaust gas exclusively to a donor cylinder exhaust manifold 119. In other embodiments, the engine may include at least one donor cylinder and at least one non-donor cylinder. For example, the engine may have four donor cylinders and eight non-donor cylinders, or three donor cylinders and nine non-donor cylinders. In some examples, the engine may have an equal number of donor and non-donor cylinders. In other examples, the engine may have more donor cylinders than non-donor cylinders. In still further examples, the engine may be comprised entirely of donor cylinders. It should be understood, the engine may have any desired numbers of donor cylinders and non-donor cylinders. Further, in some embodiments, the donor cylinders only supply exhaust gas to the donor cylinder exhaust manifold and not to the non-donor cylinder exhaust manifold. In some embodiments, the non-donor cylinders only supply exhaust gas to the non-donor cylinder exhaust manifold and not to the donor cylinder exhaust manifold.

As depicted in FIG. 1, the non-donor cylinders 105 are coupled to the exhaust passage 116 to route exhaust gas from the engine to atmosphere (after it passes through first and second turbochargers 120 and 124, and in some embodiments, through aftertreatment system 130). The donor cylinders 107, which provide engine exhaust gas recirculation (EGR), are coupled exclusively to an EGR passage 165 of an EGR system 160 which selectively routes exhaust gas from the donor cylinders 107 to the intake passage 114 of the engine 104 or to atmosphere via the exhaust passage 116. By introducing cooled exhaust gas to the engine 104, the amount of available oxygen for combustion is decreased, thereby reducing combustion flame temperatures and reducing the formation of nitrogen oxides (e.g., NOR). Additional details regarding EGR system 160 will be provided below.

As depicted in FIG. 1, the vehicle system 100 further includes a two-stage turbocharger with the first turbocharger 120 and the second turbocharger 124 arranged in series, each of the turbochargers 120 and 124 arranged between the intake passage 114 and the exhaust passage 116. The two-stage turbocharger increases air charge of ambient air drawn into the intake passage 114 in order to provide greater charge density during combustion to increase power output and/or engine-operating efficiency. The first turbocharger 120 operates at a relatively lower pressure, and includes a first turbine 121 which drives a first compressor 122. The first turbine 121 and the first compressor 122 are mechanically coupled via a first shaft 123. The first turbocharger may be referred to the "low-pressure stage" of the turbocharger. The second turbocharger 124 operates at a relatively higher pressure, and includes a second turbine 125 which drives a second compressor 126. The second turbocharger may be referred to the "high-pressure stage" of the turbocharger. The second turbine and the second compressor are mechanically coupled via a second shaft 127.

As explained above, the terms "high pressure" and "low pressure" are relative, meaning that "high" pressure is a pressure higher than a "low" pressure. Conversely, a "low" pressure is a pressure lower than a "high" pressure.

As used herein, "two-stage turbocharger" may generally refer to a multi-stage turbocharger configuration that includes two or more turbochargers. For example, a two-stage turbocharger may include a high-pressure turbocharger and a low-pressure turbocharger arranged in series, three turbocharger arranged in series, two low pressure turbochargers feeding a high pressure turbocharger, one low pressure turbocharger feeding two high pressure turbochargers, etc. In one example, three turbochargers are used in series. In another example, only two turbochargers are used in series.

In the embodiment shown in FIG. 1, the second turbocharger 124 is provided with a turbine bypass valve 128 which allows exhaust gas to bypass the second turbocharger 124. The turbine bypass valve 128 may be opened, for example, to divert the exhaust gas flow away from the second turbine 125. In this manner, the rotating speed of the compressor 126, and thus the boost provided by the turbochargers 120, 124 to the engine 104 may be regulated during steady state conditions. Additionally, the first turbocharger 120 may also be provided with a turbine bypass valve. In other embodiments, only the first turbocharger 120 may be provided with a turbine bypass valve, or only the second turbocharger 124 may be provided with a turbine bypass valve. Additionally, the second turbocharger may be provided with a compressor bypass valve 129, which allows gas to bypass the second compressor 126 to avoid compressor surge, for example. In some embodiments, first turbocharger 120 may also be provided with a compressor bypass valve, while in other embodiments, only first turbocharger 120 may be provided with a compressor bypass valve.

While not shown in FIG. 1, in some examples two low-pressure turbochargers may be present. As such, two charge air coolers (e.g., intercoolers) may be present, one positioned downstream of each low-pressure compressor. In one example, the low-pressure turbochargers may be present in parallel, such that charge air that flows through each low-pressure compressor is combined and directed to the high-pressure compressor.

While in the example vehicle system described herein with respect to FIG. 1 includes a two-stage turbocharger, it is to be understood that other turbocharger arrangements are possible. In one example, only a single turbocharger may be present. In such cases, only one charge air cooler may be utilized, rather than the two coolers depicted in FIG. 1 (e.g., intercooler 132 and aftercooler 134). In some examples, a turbo-compounding system may be used, where a turbine positioned in the exhaust passage is mechanically coupled to the engine. Herein, energy extracted from the exhaust gas by the turbine is used to rotate the crankshaft to provide further energy for propelling the vehicle system. Still other turbocharger arrangements are possible.

The vehicle system 100 optionally includes an exhaust treatment system 130 coupled in the exhaust passage in order to reduce regulated emissions. As depicted in FIG. 1, the exhaust gas treatment system 130 is disposed downstream of the turbine 121 of the first (low pressure) turbocharger 120. In other embodiments, an exhaust gas treatment system may be additionally or alternatively disposed upstream of the first turbocharger 120. The exhaust gas treatment system 130 may include one or more components. For example, the exhaust gas treatment system 130 may include one or more of a diesel particulate filter (DPF), a diesel oxidation catalyst (DOC), a selective catalytic reduction (SCR) catalyst, a three-way catalyst, a NOx trap, and/or various other emission control devices or combinations thereof. However, in some examples the exhaust aftertreatment system 130 may be dispensed with and the exhaust may flow from the exhaust passage to atmosphere without flowing through an aftertreatment device.

Additionally, in some embodiments, the EGR system 160 may include an EGR bypass passage 161 that is coupled to EGR passage 165 and is configured to divert exhaust from the donor cylinders back to the exhaust passage. The EGR bypass passage 161 may be controlled via a first valve 164. The first valve 164 may be configured with a plurality of restriction points such that a variable amount of exhaust is routed to the exhaust, in order to provide a variable amount of EGR to the intake.

The flow of EGR to the intake system via EGR passage 165 may be controlled by a second valve 170. For example, when second valve 170 is open, exhaust may be routed from the donor cylinders to one or more EGR coolers (explained in more detail below) and/or additional elements prior to being routed to the intake passage 114. The first valve 164 and second valve 170 may be on/off valves controlled by the control unit 180 (for turning the flow of EGR on or off), or they may control a variable amount of EGR, for example. In some examples, the first valve 164 may be actuated such that an EGR amount is reduced (exhaust gas flows from the EGR passage 165 to the exhaust passage 116). In other examples, the first valve 164 may be actuated such that the EGR amount is increased (e.g., exhaust gas flows from the donor cylinder manifold to the EGR passage 165). In some embodiments, the alternate EGR system may include a plurality of EGR valves or other flow control elements to control the amount of EGR.

In such a configuration, the first valve 164 is operable to route exhaust from the donor cylinders to the exhaust passage 116 of the engine 104 and the second valve 170 is operable to route exhaust from the donor cylinders to the intake passage 114 of the engine 104. As such, the first valve 164 may be referred to as an EGR bypass valve, while the second valve 170 may be referred to as an EGR metering valve. EGR that flows in EGR passage 165 only flows from the donor cylinders and does not flow from the non-donor cylinders; all exhaust from the non-donor cylinders flows to atmosphere via exhaust passage 116. In the embodiment shown in FIG. 1, the first valve 164 and the second valve 170 may be engine oil, or hydraulically, actuated valves, for example, with a shuttle valve (not shown) to modulate the engine oil. In some examples, the valves may be actuated such that one of the first and second valves 164 and 170 is normally open and the other is normally closed. In other examples, the first and second valves 164 and 170 may be pneumatic valves, electric valves, or another suitable valve.

Exhaust gas flowing from the donor cylinders 107 to the intake passage 114 passes through one or more a heat exchangers such as a first EGR cooler 166 and a second EGR cooler 167 to reduce a temperature of (e.g., cool) the exhaust gas before the exhaust gas returns to the intake passage. In order to reduce the thermal gradient across the one or more EGR coolers, the EGR may be "pre-cooled" via the first EGR cooler 166 in order to lower the temperature of the EGR entering the second EGR cooler 167. The temperature of the cooling fluid used to pre-cool the EGR in the first EGR cooler may be higher than a temperature of the cooling fluid used to cool the EGR in the second EGR cooler. In this way, the overall temperature reduction of the EGR may be split across two EGR coolers, lowering the thermal gradient to which each cooler is exposed.

As shown, first EGR cooler 166 is positioned upstream of second EGR cooler 167 in an EGR flow direction. The first EGR cooler 166 is configured to cool EGR with a first fluid and the second EGR is configured to cool EGR with a second fluid. In some examples, explained in more detail below, the first fluid may be different than the second fluid and may be at a different (e.g., higher) temperature than the second fluid. However, in other examples, the first and second fluids may be the same fluid (e.g., liquid coolant). In such examples, the first fluid may be sourced from a different location than the second fluid (e.g., the first fluid may be sourced from downstream of the engine while the second fluid may be sourced from downstream of a coolant system radiator) such that the fluids are at different temperatures.

In one example, the first fluid may be a liquid coolant and the second fluid may be a gaseous coolant. For example, the first fluid may be liquid coolant that is at a first, higher temperature (e.g., coolant that has passed through the engine) and the second fluid may be ambient air at a second, lower temperature. The first temperature may be lower than EGR temperature upstream of the first EGR cooler 166.

In another example, the first fluid may be gaseous coolant and the second fluid may be liquid coolant, such that first EGR cooler 166 is an air-to-air heat exchanger and second EGR cooler is an air-to-liquid heat exchanger. As shown in FIG. 1, the first fluid is exhaust gas from downstream of the first turbine 121 and the second fluid is liquid coolant from a vehicle coolant system 194. However, in other examples, the first fluid may be exhaust gas from downstream of the second turbine 125 or from downstream of the aftertreatment system 130, or may be intake or ambient air or other gaseous coolant. Likewise, the second fluid may be liquid coolant from a source other than the vehicle coolant system 194, such as a dedicated coolant system that does not cool other vehicle components. The liquid coolant may comprise water, oil, fuel, refrigerant, or other suitable liquid coolant.

Thus, as shown in FIG. 1, the first EGR cooler 166 is configured to cool EGR with exhaust gas from downstream of the first turbine 121. The second EGR cooler 167 is positioned downstream (in an EGR flow direction) from the first EGR cooler 166 and is configured to cool EGR with liquid coolant from coolant system 194. The EGR passage 165 is configured to direct EGR from the engine exhaust system upstream of the second turbine 125 to the first EGR cooler 166, from the first EGR cooler 166 to the second EGR cooler 167, and from the second EGR cooler 167 to the engine intake system (e.g., intake passage 114).

A cooling exhaust flow passage 190 fluidically couples the engine exhaust system downstream of the low-pressure turbine 121 to a cooling inlet of the first EGR cooler 166. An exhaust return passage 191 fluidically couples a cooling outlet of the first EGR cooler 166 to the engine exhaust system downstream of the low-pressure turbine 121. All exhaust gas that flows through the cooling exhaust flow passage 190 also flows through the exhaust return passage 191.

The first EGR cooler 166 includes an EGR inlet fluidically coupled to the EGR passage 165 and an EGR outlet fluidically coupled to the second EGR cooler 167. The first EGR cooler 166 is configured to flow EGR from the EGR inlet to the EGR outlet via one or more EGR flow passages, depicted schematically as the dashed line in first EGR cooler 166. The first EGR cooler 166 is configured to flow exhaust gas from the cooling inlet to the cooling outlet via one or more coolant passages, depicted schematically as the dotted line in first EGR cooler 166. The EGR and exhaust gas are maintained separately throughout an entirety of the first EGR cooler 166. As illustrated schematically in FIG. 1, the EGR in the EGR flow passages does not mix with the exhaust gas in the coolant passages. Further, the exhaust gas from the beginning of the exhaust passage 116 (where the exhaust passage 116 couples to the non-donor cylinder manifold) to the end of the exhaust passage 116 (e.g., where the exhaust is admitted to atmosphere) does not mix with any EGR from EGR passage 165. EGR entering the first EGR cooler 166 at the EGR inlet is at a higher pressure than exhaust gas entering the first EGR cooler 166 at the cooling inlet, at least in some examples. In some examples, the first EGR cooler 166 may be configured (e.g., with a certain heat exchanger area and/or configuration, such as parallel vs. counter-flow) to remove a designated amount of heat from the EGR prior to the EGR entering the second EGR cooler 167, such as cool the EGR by 100 or 200 degrees C.

The cooling exhaust flow passage 190 has an inlet coupled to the exhaust passage 116 of the engine exhaust system downstream of the first turbine 121, and the exhaust return passage 191 has an outlet coupled to the exhaust passage 116 downstream of the inlet of the cooling exhaust flow passage 190. A restriction may be positioned in the exhaust passage 116 intermediate the inlet of the cooling exhaust flow passage 190 and the outlet of the exhaust return passage 191 in order to increase exhaust pressure to allow exhaust gas to flow through cooling exhaust flow passage 190 and/or reduce exhaust pressure downstream of the restriction to allow the exhaust gas from the first EGR cooler 166 to be returned to the exhaust passage 116 via the exhaust return passage 191.

As shown in FIG. 1, the restriction comprises a valve 192. The valve 192 may be adjusted via a suitable actuator, such as electric or hydraulic actuator, according to a command sent from the control unit 180, for example. In some examples, the control unit 180 includes instructions to adjust a position of the valve 192 based on various system operating parameters, such as one or more of EGR temperature, exhaust gas temperature, a temperature of the liquid coolant, or a temperature of the aftertreatment device positioned in the exhaust passage downstream of the outlet of the exhaust return passage. Additional details regarding control of the valve 192 will be presented below with respect to FIG. 4.

A first coolant passage 196 is fluidically coupled to a cooling inlet of the second EGR cooler 167 and to coolant system 194. A second coolant passage 197 is fluidically coupled to a cooling outlet of the second EGR cooler 167 and to coolant system 194. In this way, liquid coolant may be supplied to the second EGR cooler 167 from the coolant system 194 and then returned to the coolant system 194 after cooling EGR in the second EGR cooler 167. Coolant system 194 may include one or more suitable components, including but not limited to a radiator, pump, degas bottle, and other coolant lines. The coolant system 194 may also cool the engine 104, charge air coolers 132 and 134, and/or other vehicle components. The second EGR cooler 167 includes an EGR inlet fluidically coupled to the EGR passage 165, downstream of the first EGR cooler 166. The second EGR cooler 167 also includes an EGR outlet fluidically coupled to an EGR mixer 172 and/or other downstream components, described below. In some examples, the second EGR cooler 167 may be configured to remove a larger amount of heat from the EGR than the first EGR cooler 166, and as such may have a larger heat exchange area.

In some examples, one or more charge air coolers 132 and 134 disposed in the intake passage 114 (e.g., upstream of where the recirculated exhaust gas enters) may be adjusted to further increase cooling of the charge air such that a mixture temperature of charge air and exhaust gas is maintained at a desired temperature. In other examples, the EGR system 160 may include one or more EGR cooler bypasses to bypass first EGR cooler 166 and/or second EGR cooler 167. Alternatively, the EGR system may include an EGR cooler control element. The EGR cooler control element may be actuated such that the flow of exhaust gas through the EGR cooler is reduced; however, in such a configuration, exhaust gas that does not flow through the EGR cooler may be directed to the exhaust passage 116 rather than the intake passage 114.

As shown in FIG. 1, the vehicle system 100 further includes an EGR mixer 172 which mixes the recirculated exhaust gas with charge air such that the exhaust gas may be evenly distributed within the charge air and exhaust gas mixture. In the embodiment depicted in FIG. 1, the EGR system 160 is a high-pressure EGR system which routes exhaust gas from a location upstream of turbochargers 120 and 124 in the exhaust passage 116 to a location downstream of turbochargers 120 and 124 in the intake passage 114. In other embodiments, the vehicle system 100 may additionally or alternatively include a low-pressure EGR system which routes exhaust gas from downstream of the turbochargers 120 and 124 in the exhaust passage 116 to a location upstream of the turbochargers 120 and 124 in the intake passage 114.

The vehicle system 100 further includes the control unit 180, which is provided and configured to control various components related to the vehicle system 100. In one example, the control unit 180 includes a computer control system. The control unit 180 further includes non-transitory, computer readable storage media (not shown) including code for enabling on-board monitoring and control of engine operation. The control unit 180, while overseeing control and management of the vehicle system 100, may be configured to receive signals from a variety of engine sensors, as further elaborated herein, in order to determine operating parameters and operating conditions, and correspondingly adjust various engine actuators to control operation of the vehicle system 100. For example, the control unit 180 may receive signals from various engine sensors including sensor 181 arranged in EGR passage 165, sensor 182 arranged in the exhaust passage 116, sensor 183 arranged in the inlet of the low-pressure compressor, and sensor 184 arranged in the inlet of the high-pressure compressor. The sensors 181, 182, 183, and 184 may detect temperature and/or pressure. Sensor 108 positioned in the intake may detect intake oxygen concentration or other suitable parameter. Additional sensors may include, but are not limited to, engine speed, engine load, boost pressure, ambient pressure, engine temperature, coolant system temperature, etc. Correspondingly, the control unit 180 may control the vehicle system 100 by sending commands to various components such as traction motors, alternator, cylinder valves, throttle, heat exchangers, valve 192, wastegates or other valves or flow control elements, EGR valves 164 and/or 170, turbine bypass valve 128, etc.

Figure 2:
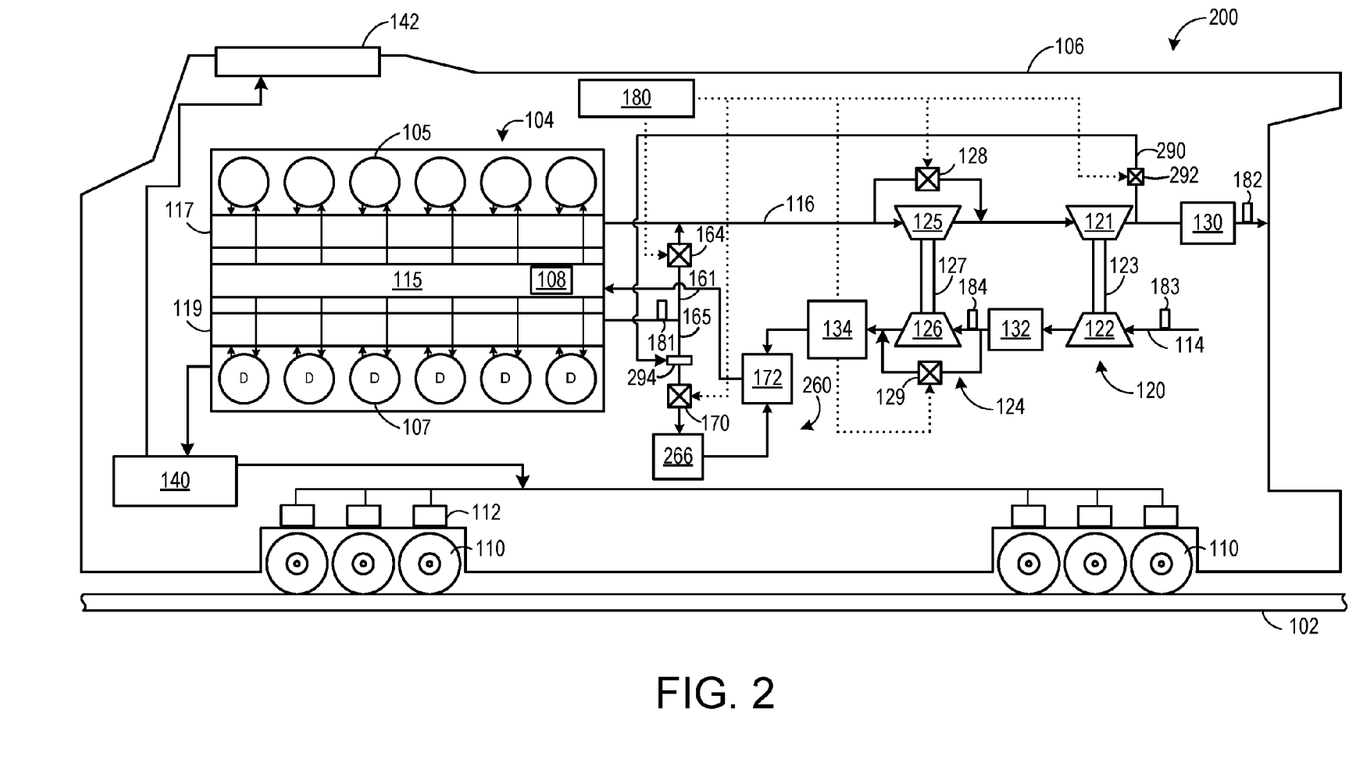
FIG. 2 shows a vehicle system with an EGR system according to a second embodiment.

Turning to FIG. 2, a second embodiment of a vehicle system 200 is illustrated. Vehicle system 200 includes many similar components to vehicle system 100, and similar components are given like numbers and additional description is not provided. Vehicle system 200 includes an EGR system 260 that differs from EGR system 160 of FIG. 1 in that EGR system 260 includes only one EGR cooler 266. EGR cooler 266 may be a liquid-to-air cooler that receives liquid coolant from a vehicle coolant system. EGR from EGR passage 165 flows to EGR cooler 266 and then to EGR mixer 172, as explained above with respect to FIG. 1.

To lower the temperature of the EGR entering EGR cooler 266, the EGR taken from the donor cylinder manifold may be mixed with exhaust gas from downstream of first turbine 121. As such, a low-pressure exhaust passage 290 may have an inlet coupled to exhaust passage 116 and an outlet fluidically coupled to EGR passage 165. Valve 292 may be positioned in low-pressure exhaust passage 290 and be adjustable (via a suitable actuator) to provide a designated amount of low-pressure exhaust to the EGR passage 165, based on EGR demand, EGR temperature, coolant temperature, and/or other parameters.

Because EGR from the donor cylinder manifold is at a higher pressure than the exhaust gas in low-pressure exhaust passage 290, a mixing device 294 may be present at the junction of the low-pressure exhaust passage 290 and EGR passage 165. The mixing device 294 may include a venturi, check valve, and/or other structure configured to create a pressure drop to suction in the low-pressure exhaust and/or prevent the higher pressure EGR from the donor cylinder manifold from flowing back to the exhaust downstream of the turbine. In one example, the high-pressure exhaust from the donor cylinder manifold flowing in the EGR passage may comprise the motive flow of the venturi, while the low-pressure exhaust gas from the low-pressure exhaust passage may be drawn in via a suction inlet of the venturi.

As described above with respect to FIG. 1, first valve 164 controls flow of exhaust gas from the donor cylinder manifold to the exhaust passage and second valve 170 controls flow of exhaust gas from the donor cylinder manifold to the EGR passage and subsequently the intake manifold. EGR that flows in EGR passage 165 upstream of the mixing device 294/junction with low-pressure exhaust passage 290 only flows from the donor cylinders and does not flow from the non-donor cylinders; all exhaust from the non-donor cylinders flows to exhaust passage 116. As described previously, first valve 164 and second valve 170 may controlled in tandem based on EGR demand (as determined based on a target intake oxygen fraction, for example).

Additionally, in some examples, first valve 164 and second valve 170 may be controlled in the same regardless of the position of valve 292. For example, if engine EGR demand dictates that first valve 164 and second valve 170 each be 50% open, the respective valves will be maintained at 50% open even when valve 292 is at least partially open and low-pressure exhaust gas from downstream of the low-pressure turbine is provided to EGR passage 165. However, in other examples, the control of at least first valve 164 may change based on the position of valve 292. Using the example valve positions described above, first valve 164 and second valve 170 may be commanded to be 50% open based on EGR demand when valve 292 is fully closed, but if valve 292 opens, first valve 164 may be adjusted to accommodate the increased amount of donor cylinder exhaust that may flow to the exhaust passage via bypass passage 161 (e.g., the amount of donor cylinder exhaust that is displaced by the low-pressure exhaust gas).

Figure 3:
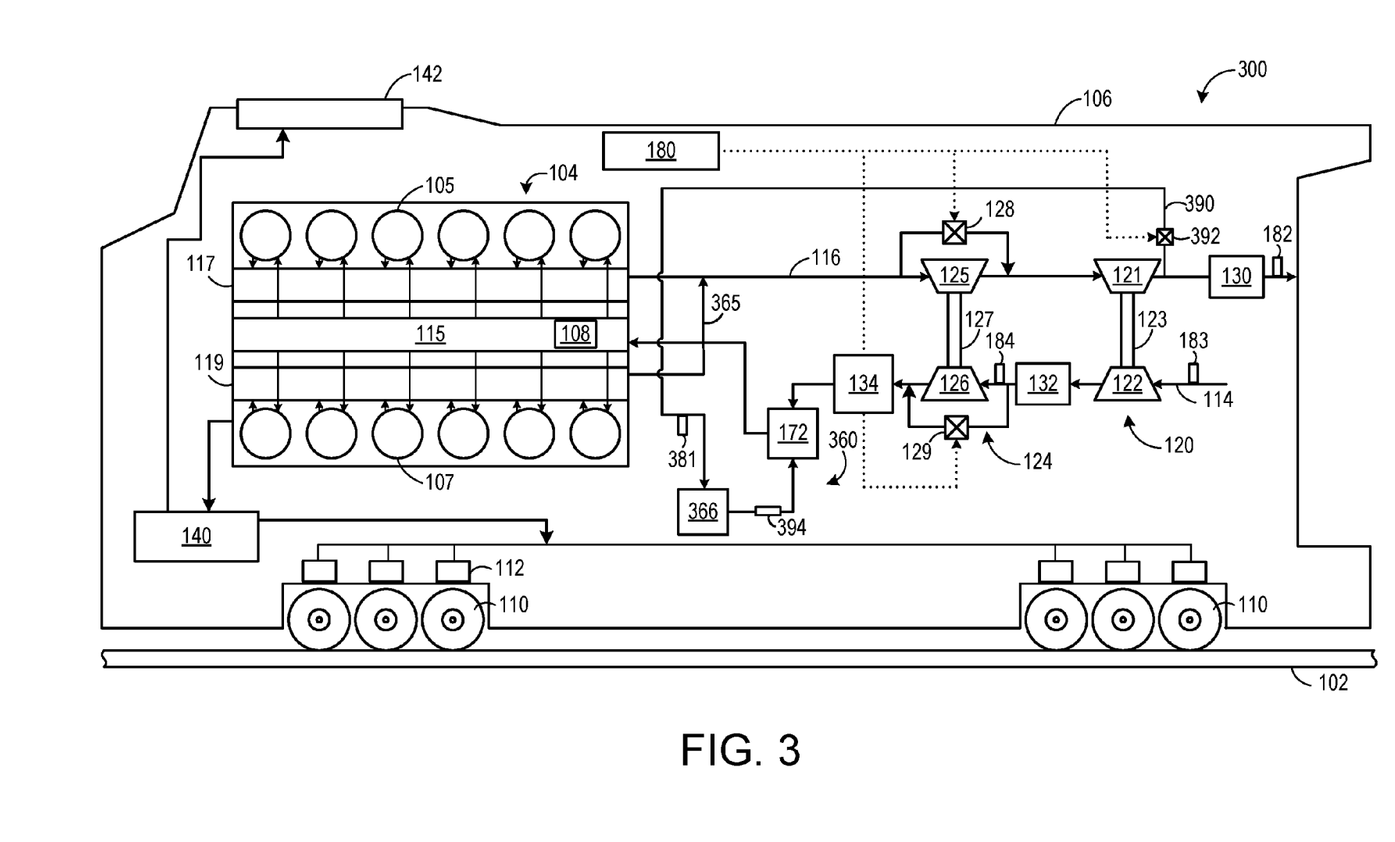
FIG. 3 shows a vehicle system with an EGR system according to a third embodiment.

FIG. 3 illustrates a third embodiment of a vehicle system 300. Vehicle system 300 includes many similar components to vehicle system 100, and similar components are given like numbers and additional description is not provided. Vehicle system 300 includes an EGR system 360 that differs from EGR system 160 of FIG. 1 in that EGR system 360 includes only one EGR cooler 366. EGR cooler 366 may be a liquid-to-air cooler that receives liquid coolant from a vehicle coolant system. EGR from low-pressure exhaust passage 390 flows to EGR cooler 366 and then to EGR mixer 172 and eventually the intake passage 114.

To lower the temperature of the EGR entering EGR cooler 366, the exhaust gas 365 from the donor cylinder manifold 119 may be routed to the exhaust passage 116, and the exhaust sourced for the EGR is taken from downstream of the first turbine 121. As such, the low-pressure exhaust passage 390 may have an inlet coupled to exhaust passage 116 and an outlet fluidically coupled to EGR cooler 366. Valve 392 may be positioned in low-pressure exhaust passage 390 and be adjustable (via a suitable actuator) to provide a designated amount of low-pressure exhaust to the EGR cooler 366, based on output from sensor 381 (which may sense low-pressure exhaust flow rate, pressure, oxygen content, and/or other suitable parameter) and a designated intake oxygen amount, for example. A device 394 may be positioned downstream of EGR cooler 366 and upstream of mixer 172. The device 394 may include a venturi to draw the low-pressure exhaust and/or a check valve to prevent entry of high-pressure charge air from downstream of cooler 134 into passage 390.

Because EGR is sourced from downstream of the first turbine 121 and not from upstream of the second turbine 125, the high-pressure donor cylinder EGR is dispensed with, and all exhaust gas from both the donor cylinder manifold and non-donor cylinder manifold is mixed in the exhaust passage 116.

Figure 4:
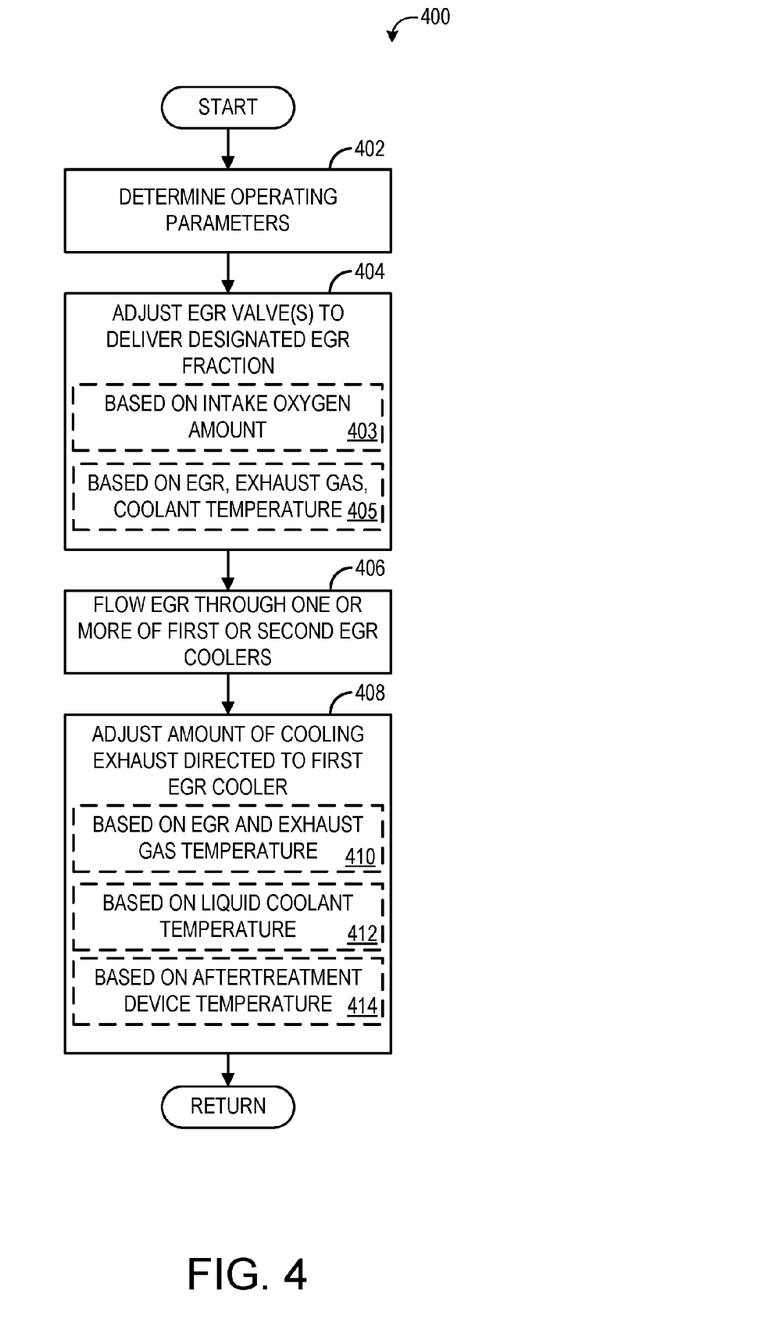
FIG. 4 is a flow chart illustrating an embodiment of a method for controlling an EGR system.

FIG. 4 is a flow chart illustrating a method 400 for controlling an EGR system, such as the EGR system 160 of FIG. 1, EGR system 260 of FIG. 2, or EGR system 360 of FIG. 3. Method 400 may be carried out by a control unit, such as control unit 180, according to non-transitory instructions stored in memory of the control unit.

At 402, method 400 includes determining operating parameters. The determined operating parameters may include engine speed, engine load, engine temperature, exhaust gas temperature (as sensed by sensor 182, for example), EGR temperature (as sensed by sensor 181, for example), coolant system coolant temperature, and other parameters. At 404, method 400 includes adjusting one or more EGR valves to deliver a designated EGR fraction to an intake of an engine. The one or more EGR valves may include an EGR bypass valve and/or EGR metering valve, such as first valve 164 and second valve 170 of FIG. 1, or may include a low-pressure exhaust valve, such as valve 292 of FIG. 2 or valve 392 of FIG. 3. The EGR valve(s) may be adjusted to provide an EGR amount (e.g., intake fraction, flow rate, or other suitable amount) based on sensed intake oxygen fraction (from sensor 108, for example) and a target intake oxygen concentration, for example, as indicated at 403. In other examples, the EGR valve(s) may be adjusted based on engine speed, engine load, notch throttle position, or other parameters.

Further, as explained above, one example EGR system (e.g., EGR system 260 of FIG. 2) may mix EGR from the donor manifold with exhaust gas from downstream of the turbine to reduce the temperature of the EGR entering the EGR cooler. The amount of exhaust gas directed from downstream of the turbine may be based on the EGR demand, as explained above, and further based on the temperature of the EGR (as sensed by sensor 181, for example), the temperature of the exhaust gas downstream of the turbine, and/or the temperature of the coolant in the EGR cooler. Thus, as indicated at 405, the EGR valve(s) may be further adjusted based on EGR, exhaust gas, and/or coolant temperature.

At 406, method 400 includes flowing EGR through one or more of a first EGR cooler or a second EGR cooler, such as first EGR cooler 166 and second EGR cooler 167 of FIG. 1, or EGR cooler 266 or 366. After flowing through the EGR cooler(s), the EGR is directed to the intake of the engine. As explained above with respect to FIG. 1, in some examples, the EGR may first flow through the first EGR cooler and may then flow through the second EGR cooler.

At 408, method 400 optionally includes adjusting an amount of cooling exhaust directed to the first EGR cooler. As explained above, the first EGR cooler may be a secondary cooler that pre-cools the EGR using exhaust gas from downstream of a turbine, such as turbine 121 of FIG. 1. The amount of exhaust from downstream of the turbine that flows to the first EGR cooler may be controlled via a valve, such as valve 192 of FIG. 1. The valve may be adjusted to create suitable exhaust pressure conditions that allow for exhaust from downstream of the turbine to be directed to the EGR cooler and then back to the exhaust passage, as explained above with respect to FIG. 1. Further, the valve may be adjusted based on the amount of EGR flowing through the first EGR cooler. For example, the valve may be fully opened when EGR is disabled, and thus little or no cooling exhaust gas may be routed to the first EGR cooler. When the valve is at a more closed or fully closed position, pumping losses and/or turbine outlet pressure may be increased, reducing engine efficiency, and thus when there is no cooling demand at the first EGR cooler, it may be advantageous to prevent the cooling exhaust gas from flowing to the first EGR cooler.

In some examples, the valve may be additionally or alternatively adjusted based on various system temperatures. In one example, as indicated at 410, the valve may be adjusted based on EGR and cooling exhaust temperatures. For example, if the cooling exhaust (exhaust from downstream of the turbine) is at a relatively high temperature (e.g., within a threshold range of the EGR temperature, such as within 100 degrees C.), the valve may be adjusted to a more open position to direct less cooling exhaust to the first EGR cooler. If the cooling exhaust is at a relatively low temperature (e.g., 100 degrees C. or more lower than the EGR temperature), the valve may be adjusted to a more closed position to flow more cooling exhaust to the first EGR cooler. In this way, when the cooling exhaust is the same temperature (or not significantly cooler) than the EGR temperature, the cooling exhaust may be directed to atmosphere without passing through the first EGR cooler, reducing the pumping losses and/or increased turbine outlet pressure that may be associated with flowing the cooling exhaust to the first EGR cooler.

In some examples, the valve may be adjusted based on liquid coolant temperature, as indicated at 412. For example, if the liquid coolant temperature is equal to or higher than the cooling exhaust temperature, no additional cooling benefits may be gained by flowing the cooling exhaust to the first EGR cooler, and thus the valve may be moved to a more open position.

Further, the valve may be adjusted based on an aftertreatment device temperature, as indicated at 414. The aftertreatment device, such as aftertreatment system 130 of FIG. 1, may include a catalyst that performs optimally when at a certain temperature, referred to as the light-off temperature. If the aftertreatment device is below the light-off temperature, diverting exhaust to the first EGR cooler may delay aftertreatment device warm-up and thus the valve may be moved to a more open (e.g., fully open) position to direct as much exhaust gas as possible to the aftertreatment device. In contrast, if the aftertreatment device temperature is above an upper threshold temperature, the aftertreatment device may degrade and thus the valve may be moved to a more closed position (e.g., fully closed) to route as much exhaust gas as possible to the first EGR cooler. In doing so, the exhaust gas that reaches the aftertreatment device may be lower in temperature than if the exhaust gas was directly routed to the aftertreatment device. Such a control may be independent of cooling demands at the first EGR cooler (e.g., when aftertreatment device temperature is high, the valve may be closed even when the exhaust gas is not needed for cooling, such as when EGR temperature is lower than exhaust gas temperature). Method 400 then returns.

In this way, the thermal load on a given EGR cooler may be reduced by splitting the cooling of the EGR between two separate EGR coolers. In other examples, the temperature of the EGR may be reduced prior to entering the EGR cooler by mixing the EGR with exhaust gas from downstream of a turbine, or by fully replacing the high-pressure EGR with low-pressure EGR. By doing so, the thermal gradient at an EGR cooler may be reduced, lowering stress placed on the EGR cooler and prolonging the life of the EGR cooler.

An embodiment relates to an exhaust gas recirculation (EGR) system, including an EGR passage coupling an engine exhaust system to an engine intake system, a first EGR cooler positioned in the EGR passage, the first EGR cooler configured to cool EGR with a first fluid, and a second EGR cooler positioned in the EGR passage downstream of the first EGR cooler, the second EGR cooler configured to cool EGR with a second fluid.

In one example, the first fluid comprises liquid coolant and the second fluid comprises exhaust gas from downstream of a turbine. In another example, the first fluid comprises exhaust gas from downstream of a turbine and the second fluid comprises liquid coolant. In such an example, the EGR passage may be configured to direct EGR from the engine exhaust system upstream of the turbine to the first EGR cooler, from the first EGR cooler to the second EGR cooler, and from the second EGR cooler to the engine intake system. Such an example may further comprise a cooling exhaust flow passage fluidically coupling the engine exhaust system downstream of the turbine to a cooling inlet of the first EGR cooler. Such an example may further comprise an exhaust return passage fluidically coupling a cooling outlet of the first EGR cooler to the engine exhaust system downstream of the turbine, wherein all exhaust gas that flows through the cooling exhaust flow passage also flows through the exhaust return passage.

Such an example may include the first EGR cooler comprising an EGR inlet fluidically coupled to the EGR passage and an EGR outlet fluidically coupled to the second EGR cooler. Such an example may include the first EGR cooler being configured to flow EGR from the EGR inlet to the EGR outlet via one or more EGR flow passages, the first EGR cooler being configured to flow exhaust gas from the cooling inlet to the cooling outlet via one or more coolant passages, and the EGR and exhaust gas being maintained separately throughout an entirety of the first EGR cooler. Such an example may include EGR entering the first EGR cooler at the EGR inlet being at a higher pressure than exhaust gas entering the first EGR cooler at the cooling inlet.

Such an example may include the cooling exhaust flow passage having an inlet coupled to an exhaust passage of the engine exhaust system downstream of the turbine, the exhaust return passage having an outlet coupled to the exhaust passage downstream of the inlet of the cooling exhaust flow passage, and further including a restriction in the exhaust passage intermediate the inlet of the cooling exhaust flow passage and the outlet of the exhaust return passage. In an example, the restriction comprises a valve, and the system may further comprise a controller configured to adjust a position of the valve based on one or more of EGR temperature, exhaust gas temperature, a temperature of the liquid coolant, or a temperature of a catalyst positioned in the exhaust passage downstream of the outlet of the exhaust return passage. Such an example may further comprise a first coolant passage fluidically coupled to a cooling inlet of the second EGR cooler and a second coolant passage fluidically coupled to a cooling outlet of the second EGR cooler, and the second EGR cooler may include an EGR inlet fluidically coupled to the EGR passage.

Another embodiment of a system includes an engine having a first subset of cylinders and a second subset of cylinders; a first exhaust manifold coupled to the first subset of cylinders and a second exhaust manifold coupled to the second subset of cylinders; a high-pressure turbocharger turbine coupled in an exhaust passage downstream of the engine; a low-pressure turbocharger turbine coupled in the exhaust passage downstream of the high-pressure turbocharger turbine; an EGR passage coupling the first exhaust manifold to an intake manifold of the engine; a first EGR cooler positioned in the EGR passage, the first EGR cooler comprising an air-to-air heat exchanger including an EGR inlet fluidically coupled to the EGR passage and a cooling inlet fluidically coupled to the exhaust passage downstream of the low-pressure turbocharger turbine; and a second EGR cooler positioned in the EGR passage downstream of the first EGR cooler, the second EGR cooler comprising a liquid-to-air heat exchanger including an EGR inlet coupled to the EGR passage and a cooling inlet fluidically coupled to a coolant passage. In an example, the system further includes an exhaust flow control valve positioned in the exhaust passage downstream of the low-pressure turbocharger turbine, a first EGR valve positioned in the EGR passage upstream of the first EGR cooler, and a second EGR valve positioned between the first exhaust manifold and the exhaust passage.

Another embodiment of a system includes an engine having a first subset of cylinders and a second subset of cylinders; a first exhaust manifold coupled to the first subset of cylinders and a second exhaust manifold coupled to the second subset of cylinders; a high-pressure turbocharger turbine coupled in an exhaust passage downstream of the engine; a low-pressure turbocharger turbine coupled in the exhaust passage downstream of the high-pressure turbocharger turbine; an EGR passage coupling the first exhaust manifold to an intake manifold of the engine; and a low-pressure exhaust passage coupling the exhaust passage downstream of the low-pressure turbine to the EGR passage via a venturi. In an example, the system further comprises a valve positioned in the low-pressure exhaust passage and a controller configured to adjust a position of the valve based on one or more of EGR demand or a temperature of EGR in the EGR passage.

An embodiment of a method includes directing exhaust gas from upstream of a turbocharger turbine to an exhaust gas inlet of a first exhaust gas recirculation (EGR) cooler and directing exhaust gas from downstream of the turbocharger turbine to one or more coolant passages of the first EGR cooler; and directing exhaust gas from an exhaust gas outlet of the first EGR cooler to an exhaust gas inlet of a second EGR cooler, and directing cooling system coolant to one or more coolant passages of the second EGR cooler.

In one example, directing exhaust gas from downstream of the turbocharger turbine to one or more coolant passages of the first EGR cooler may include adjusting an amount of exhaust gas directed from downstream of the turbocharger turbine to one or more coolant passages of the first EGR cooler based on a temperature of the exhaust gas downstream of the turbocharger turbine relative to a temperature of exhaust gas upstream of the turbocharger turbine. In an example, directing exhaust gas from downstream of the turbocharger turbine to one or more coolant passages of the first EGR cooler may include adjusting an amount of exhaust gas directed from downstream of the turbocharger turbine to one or more coolant passages of the first EGR cooler based on a temperature of a catalyst positioned downstream of the turbocharger turbine. In an example, adjusting the amount of exhaust gas directed from downstream of the turbocharger turbine to one or more coolant passages of the first EGR cooler based on the temperature of the catalyst may include decreasing the amount of exhaust gas directed from downstream of the turbocharger turbine to one or more coolant passages of the first EGR cooler responsive to catalyst temperature being below a first threshold temperature. In an example, adjusting the amount of exhaust gas directed from downstream of the turbocharger turbine to one or more coolant passages of the first EGR cooler based on the temperature of the catalyst may include increasing the amount of exhaust gas directed from downstream of the turbocharger turbine to one or more coolant passages of the first EGR cooler responsive to catalyst temperature being above a second threshold temperature. In an example, directing exhaust gas from downstream of the turbocharger turbine to one or more coolant passages of the first EGR cooler may include adjusting an amount of exhaust gas directed from downstream of the turbocharger turbine to one or more coolant passages of the first EGR cooler based on a temperature of the cooling system coolant.

As used herein, an element or step recited in the singular and proceeded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. An exhaust gas recirculation (EGR) system, comprising:
   an EGR passage coupling an engine exhaust system to an engine intake system;
   a first EGR cooler positioned in the EGR passage, the first EGR cooler configured to cool EGR with exhaust gas from downstream of a turbine;
   a cooling exhaust flow passage fluidically coupling the engine exhaust system downstream of the turbine to a cooling inlet of the first EGR cooler, the cooling exhaust flow passage including an inlet coupled to an exhaust passage of the engine exhaust system downstream of the turbine;
   an exhaust return passage fluidically coupling a cooling outlet of the first EGR cooler to the engine exhaust system downstream of the turbine, the exhaust return passage including an outlet coupled to the exhaust passage downstream of the inlet of the cooling exhaust flow passage;
   a valve in the exhaust passage intermediate the inlet of the cooling exhaust flow passage and the outlet of the exhaust return passage;
   a second EGR cooler positioned in the EGR passage downstream of the first EGR cooler, the second EGR cooler configured to cool EGR with liquid coolant; and
   a controller configured to adjust a position of the valve based on a temperature of a catalyst positioned in the exhaust passage downstream of the outlet of the exhaust return passage or a temperature of an exhaust gas downstream of a turbocharger turbine relative to a temperature of exhaust gas upstream of the turbocharger turbine.

2. The EGR system of claim 1, wherein the EGR passage is configured to direct EGR from the engine exhaust system upstream of the turbine to the first EGR cooler, from the first EGR cooler to the second EGR cooler, and from the second EGR cooler to the engine intake system.

3. The EGR system of claim 1, wherein all exhaust gas that flows through the cooling exhaust flow passage also flows through the exhaust return passage.

4. The EGR system of claim 3, wherein the first EGR cooler comprises an EGR inlet fluidically coupled to the EGR passage and an EGR outlet fluidically coupled to the second EGR cooler.

5. The EGR system of claim 4, wherein the first EGR cooler is configured to flow EGR from the EGR inlet to the EGR outlet via one or more EGR flow passages, wherein the first EGR cooler is configured to flow exhaust gas from the cooling inlet to the cooling outlet via one or more coolant passages, and wherein the EGR and exhaust gas are maintained separately throughout an entirety of the first EGR cooler.

6. The EGR system of claim 4, wherein EGR entering the first EGR cooler at the EGR inlet is at a higher pressure than exhaust gas entering the first EGR cooler at the cooling inlet.

7. The EGR system of claim 1, further comprising a first coolant passage fluidically coupled to a cooling inlet of the second EGR cooler and a second coolant passage fluidically coupled to a cooling outlet of the second EGR cooler, and wherein the second EGR cooler comprises an EGR inlet fluidically coupled to the EGR passage.

8. A method for controlling an exhaust gas recirculation in a turbocharged engine, comprising:
   determining an operating condition of the engine via a controller based on indications of a temperature of a catalyst positioned downstream of the turbocharger turbine or a temperature of an exhaust gas downstream of a turbocharger turbine relative to a temperature of an exhaust gas upstream of the turbocharger turbine;
   directing exhaust gas from upstream of a turbocharger turbine to an exhaust gas inlet of a first exhaust gas recirculation (EGR) cooler and directing exhaust gas from downstream of the turbocharger turbine to one or more coolant passages of the first EGR cooler, including controlling a valve via the controller in the exhaust passage intermediate the inlet of the cooling exhaust flow passage and the outlet of the exhaust return passage to adjust an amount of exhaust gas directed from downstream of the turbocharger turbine to one or more coolant passages of the first EGR cooler based on the temperature of the catalyst positioned downstream of the turbocharger turbine or the temperature of the exhaust gas downstream of the turbocharger turbine relative to the temperature of exhaust gas upstream of the turbocharger turbine; and
   directing exhaust gas from an exhaust gas outlet of the first EGR cooler to an exhaust gas inlet of a second EGR cooler, and directing cooling system coolant to one or more coolant passages of the second EGR cooler.

9. The method of claim 8, wherein directing exhaust gas from downstream of the turbocharger turbine to one or more coolant passages of the first EGR cooler comprises controlling the valve via the controller in the exhaust passage intermediate the inlet of the cooling exhaust flow passage and the outlet of the exhaust return passage to adjust an amount of exhaust gas directed from downstream of the turbocharger turbine to one or more coolant passages of the first EGR cooler based on the temperature of the exhaust gas downstream of the turbocharger turbine relative to the temperature of the exhaust gas upstream of the turbocharger turbine.

10. The method of claim 8, further comprising:
    closing the valve in the exhaust passage intermediate the inlet of the cooling exhaust flow passage and the outlet of the exhaust return passage with the controller to decrease the amount of exhaust gas directed from downstream of the turbocharger turbine to one or more coolant passages of the first EGR cooler responsive to catalyst temperature being below a first threshold temperature.

11. The method of claim 8, further comprising:
    opening the valve in the exhaust passage intermediate the inlet of the cooling exhaust flow passage and the outlet of the exhaust return passage with the controller to increase the amount of exhaust gas directed from downstream of the turbocharger turbine to one or more coolant passages of the first EGR cooler responsive to catalyst temperature being above a second threshold temperature.

12. The method of claim 8, wherein directing exhaust gas from downstream of the turbocharger turbine to one or more coolant passages of the first EGR cooler further comprises controlling the valve via the controller in the exhaust passage intermediate the inlet of the cooling exhaust flow passage and the outlet of the exhaust return passage to adjust an amount of exhaust gas directed from downstream of the turbocharger turbine to one or more coolant passages of the first EGR cooler based on a temperature of the cooling system coolant.

* * * * *